Aug. 23, 1932.   C. P. EISENHAUER   1,872,704
AUTOMATIC WATER SOFTENER
Filed Oct. 12, 1925   4 Sheets-Sheet 1

INVENTOR
CHARLES P. EISENHAUER.
BY *Toulmin & Toulmin*
ATTORNEYS

Aug. 23, 1932.   C. P. EISENHAUER   1,872,704
AUTOMATIC WATER SOFTENER
Filed Oct. 12, 1925    4 Sheets-Sheet 2
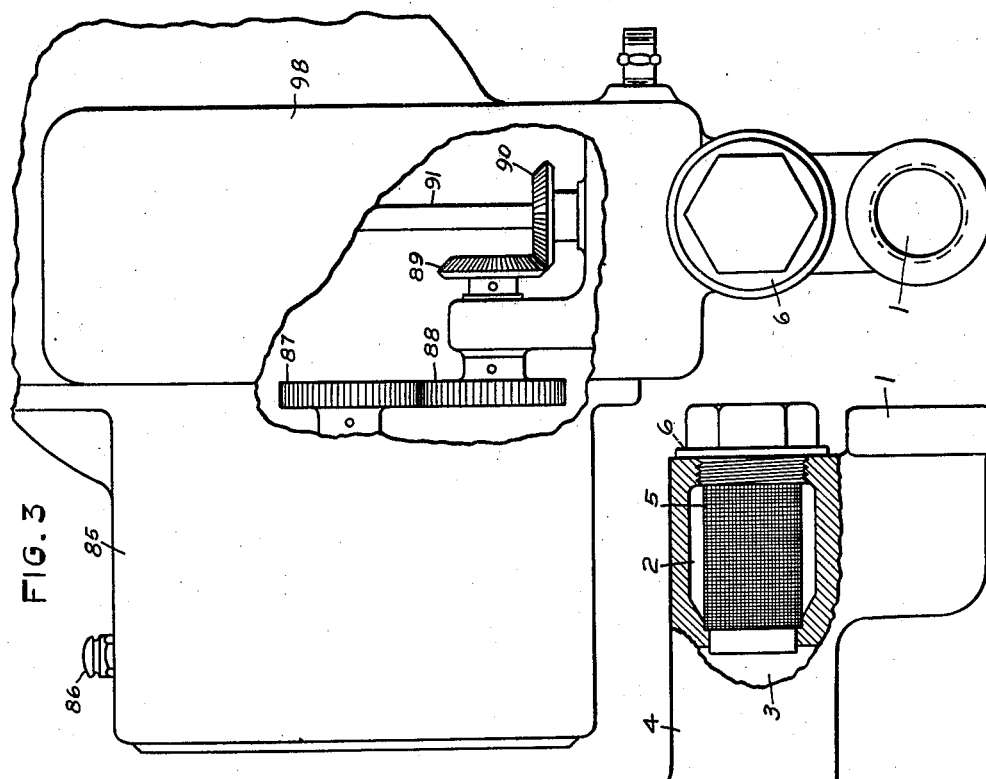
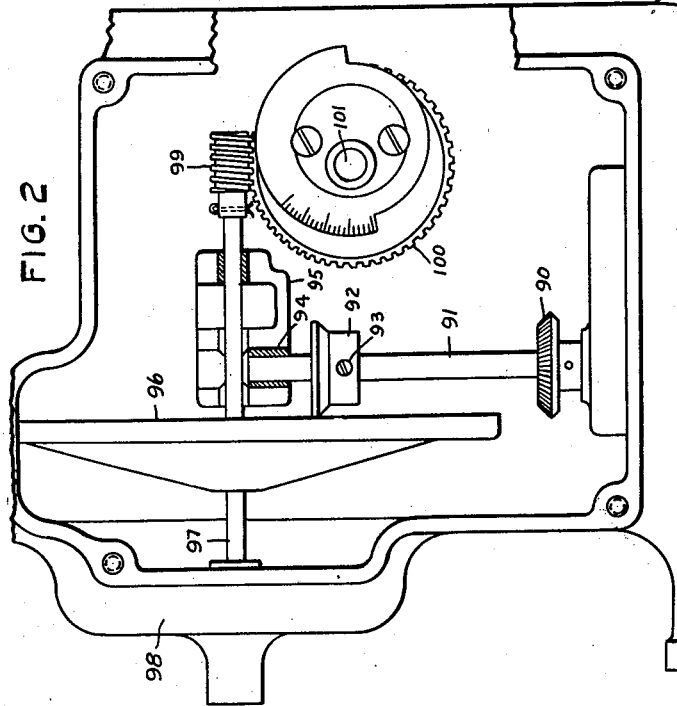
INVENTOR
CHARLES P. EISENHAUER
BY Toulmin&Toulmin,
ATTORNEYS

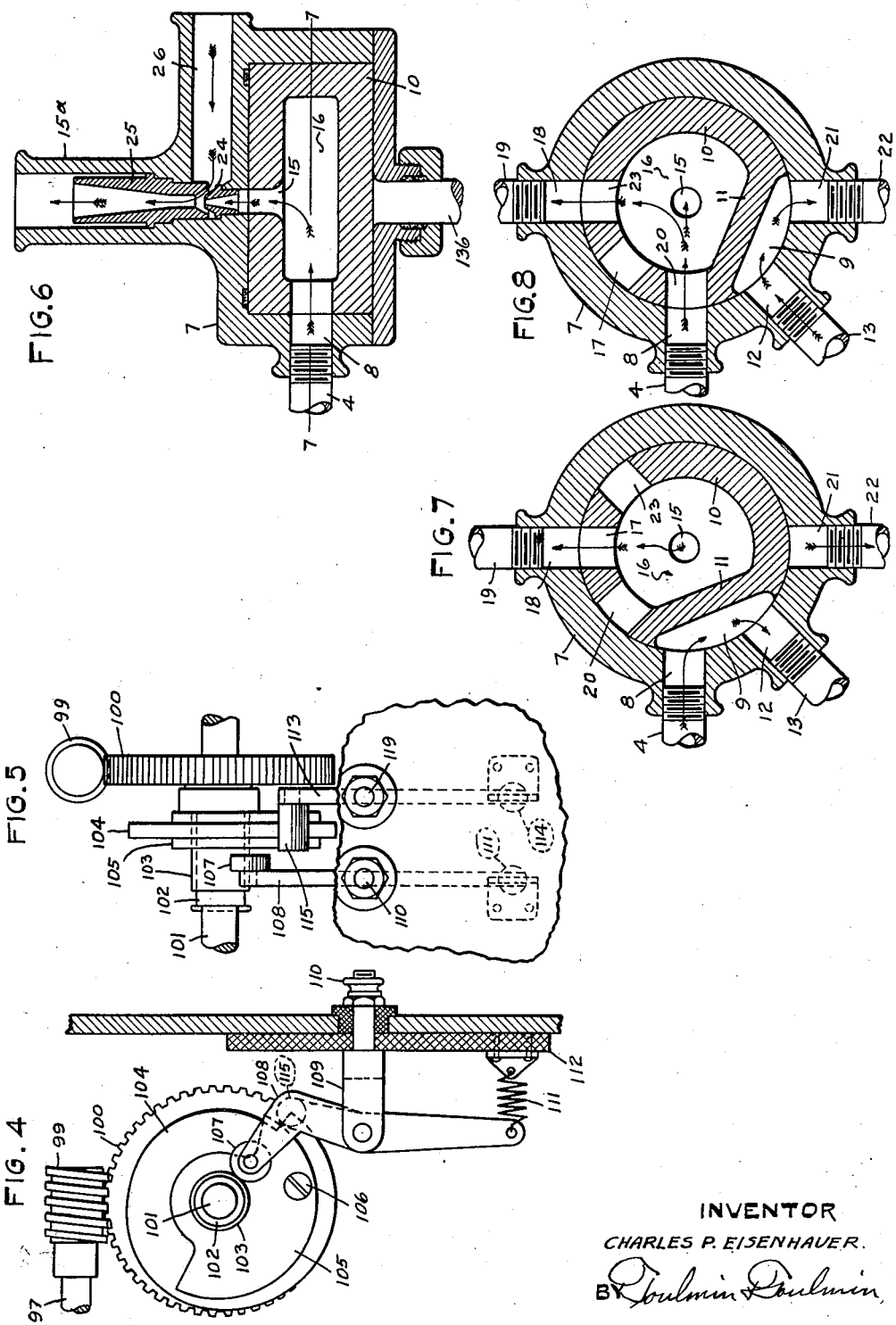

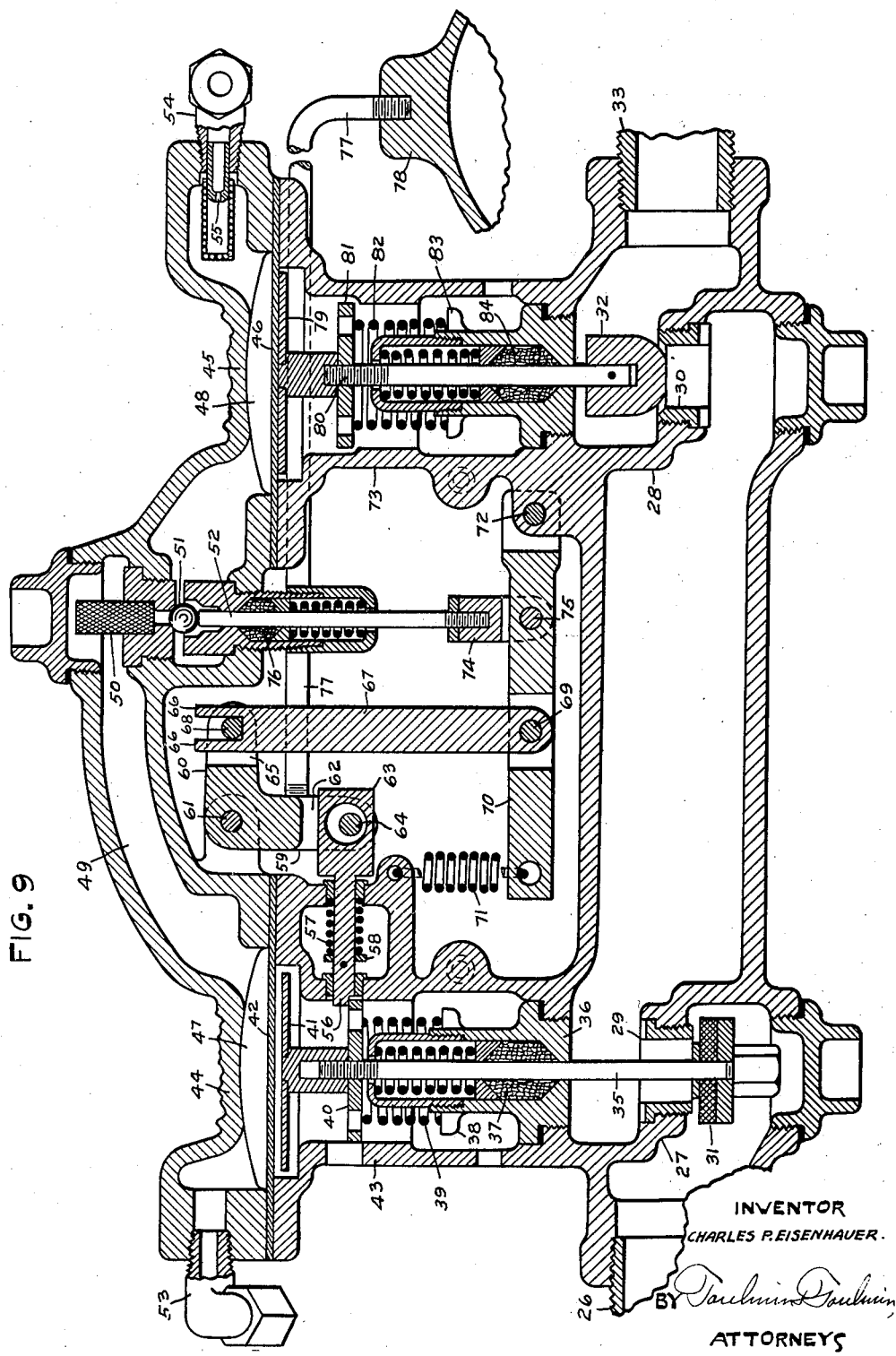

Patented Aug. 23, 1932

1,872,704

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

AUTOMATIC WATER SOFTENER

Application filed October 12, 1925. Serial No. 61,998.

My invention relates to water softeners and in particular to an automatic water softener.

It is the object of my invention to provide a self-winding clock adapted to operate electrically a needle valve control which controls the application of hydrostatic pressure to a rotary valve for converting the system from softening position to regenerating position and back to softening position, and the application of hydrostatic pressure to auxiliary brine and refill valves which control the passage of brine to the softening material and a replenishment of the water in the brine tank.

In the accompanying drawings:

Figure 2 is an elevation of the operating mechanism and cams with the cover removed in order to show the cams, and with the supporting bracket for the driving shafts in section;

Figure 3 is a side elevation of the same mechanism with the cover partially broken away to show the internal gearing;

Figure 4 is a detail elevation of the electrical contact mechanism cooperating with the cams;

Figure 5 is an end elevation thereof partially in section;

Figure 6 is a section taken horizontally through the master control rotary valve;

Figure 7 is a section on the line 7—7 of Figure 6 showing the parts in softening position;

Figure 8 is a similar view showing the parts in regenerating position;

Figure 9 is a section through the unit comprising a refill valve and a brine valve.

Figure 1:
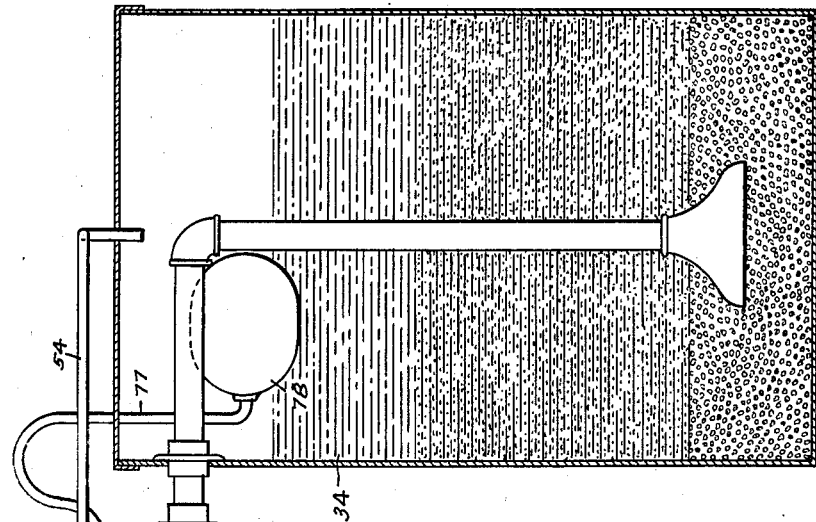
Figure 1 is an elevation of the complete system with the needle valve and its electrically operated mechanism disclosed by a partial section, and the master or main hydrostatic pressure valve partially in section.
Figure 1:
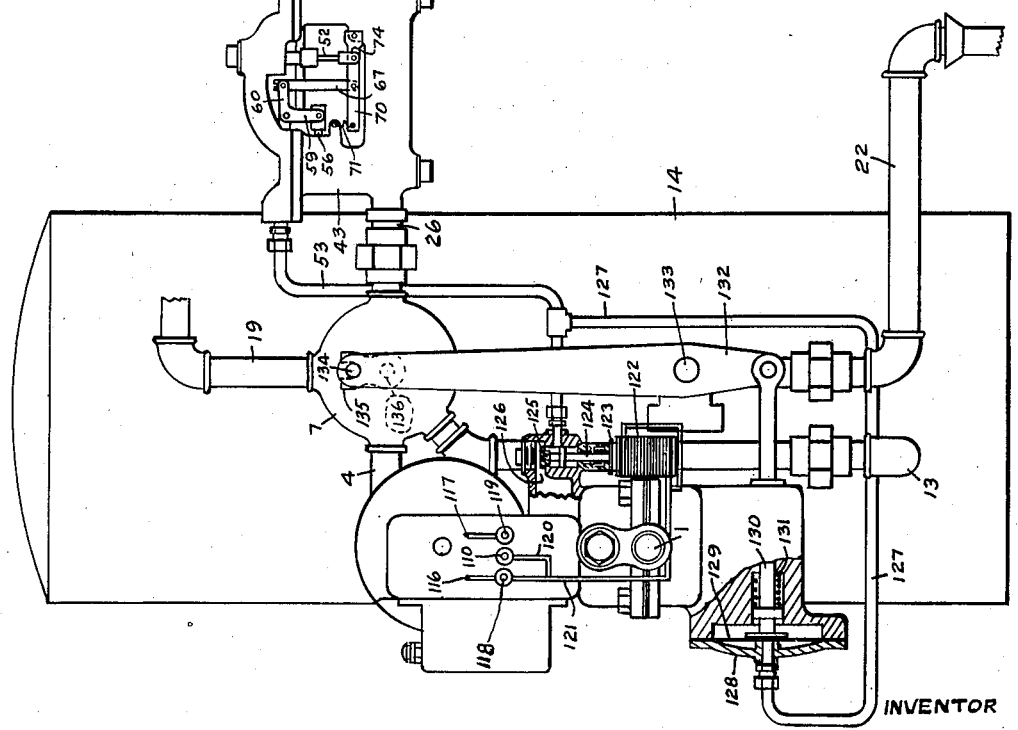

Referring to the drawings in detail, 1 is the incoming hard water pipe which communicates with the chamber 2 having an opening 3 in the main pipe 4. This chamber contains a screen 5 held in position by a screw plug 6, the free end of the screen closing the opening 3 of the chamber 2. This strains the water initially.

The water passes through the pipe 4 into the casing 7 of the master rotary valve. If the parts are in softening position as shown in Figure 7, the water passing through the pipe 4 will pass into the port 8 in the casing 7, thence through the cutaway portion 9 to one side of the rotor 10 adjacent its flat portion 11, thence into the port 12 of the casing and out through the pipe 13 to the bottom of the softening tank 14, passing upwardly through the mineral in the tank in the customary manner and out through the top of the tank, through the pipe communicating with the opening 15 so that the water is brought into the hollow interior of the rotor 10 in the space marked 16 whence it passes out through the port 17 in the rotor through the port 18 in the casing 7 and through the pipe 19 to service.

When the parts are turned, as shown in Figure 8, the direction of the water through the tank is reversed in order to carry with the water the brine and in order to wash the mineral after the brine has been applied. Consequently, the water passes through the pipe 4, port 8, port 20 of the rotor into the opening 15, through the pipe to the top of the tank, thence downwardly through the tank and out the bottom pipe of the tank 14 through the port 12, passageway 9 into the port 21 to the drain pipe 22. A portion of the hard water which enters through the port 20 of the rotor passes through the port 23 in the rotor, the port 18 in the casing and the pipe 19 to service in order to by-pass hard water to service. While this is taking place, the hard water, which is passing through the port 15 to the top of the tank through the pipe 15a, is passing through a pair of restricted opening members 24 and 25 which are spaced from one another and forming an injector to draw brine into the tank between these spaced members from the pipe line 26 which leads to the brine tank and, in which line, is located a unit comprising a refill valve 31 and a brine valve 32, shown in section in Figure 9.

Turning to these refill and brine valves, it will be noted that the pipe 26 is connected to a casting having a tubular opening therein divided at either end by partitions 27 and 28 which respectively support the valve seats 29 and 30 for the refill valve member 31 and the brine valve member 32. This tubular casting is connected by the pipe 33 to the brine tank 34. The refill valve member 31 is supported on a valve stem 35 which passes upwardly through a guide casing 36 having spring-pressed packing 37 on which casing is mounted a shoulder 38 for supporting a spring 39 to move the valve mechanism in one direction. The other end of this spring engages with a plate 40 carried by the valve stem which is also used as a locking plate, which will be hereinafter described. Above this plate on top of the valve stem 35 is mounted a diaphragm plate 41 adapted to engage with the diaphragm 42 which is made of some flexible material. This diaphragm is supported on a housing of the valve which is an integral part of the complete casting, such housing being designated 43. Its edges are maintained on this housing or platform by a cap-like casting which has, at either end, a circular inverted cup-shaped portion 44 and 45, the margins of which rest upon the refill valve diaphragm 42 and the brine valve diaphragm 46. These cup-shaped portions form chambers 47 and 48 above these diaphragms connected by a tubular passageway 49 in which is interposed a screen 50 and below the screen a ball valve 51 actuated by a valve stem 52, which valve stem is controlled as hereinafter described.

Access to the diaphragm chamber 47 for hydrostatic pressure, is secured through the pipe 53, while at the other end of the casting adjacent the other diaphragm chamber there is located an exit pipe 54 having a bleed opening 55. This pipe drains into the salt tank.

The refill valve 31 is locked open during a certain period of the operation of the softener. In order to do this, I provide a locking plunger 56 which reciprocates in a part of the casting 43 of the refill valve and is so arranged that the head of the plunger projects into the path of the locking plate 40. This locking plate is carried by the valve stem 35. The locking plunger is forced inwardly by the spring 57 working against a shoulder 58 on the plunger at one end and against a portion of the casting 43 at the other end. Pivoted on this casting is a bell crank having arms 59 and 60. The point of pivot is 61. The arm 59 is bifurcated at 62 to receive, between its bifurcated ends, the head 63 of the plunger 56 which is pivoted thereto on the pivots 64. Thus, when the bell crank moves, the locking plunger is also moved inwardly and outwardly. The other arm of the bell crank 60 has a pair of spaced arms 65, between which is located the jaws 66 of a link 67. Between these jaws 66 is located a cross pin 68 carried by the jaws 65 of the bell crank.

The bottom of the link 67 is pivoted at 69 on a lever 70, one end of which is supported by a spring 71, the free end of which is hung on the casting 43. The other end of this lever is pivoted at 72 on the casting 73 which surrounds the valve mechanism of the brine valve. Intermediate between the pivotal points 72 and 69 is a pivoted member 74 pivoted on the lever 70 at 75 and carrying at its free upper end the valve stem 52. This valve stem has the usual spring-pressed packing 76. Also connected to the bell crank having the arms 59 and 60 is the float arm 77 and float 78, which float rests in the brine tank.

Turning to the brine valve, it will be noted that it has a diaphragm plate 79 on its valve stem 80 with a plate 81 on the valve stem engaging with a spring 82 which moves the valve in one direction. This spring is mounted upon a shoulder 83 at its other end surrounding a chamber containing spring-pressed packing 84.

During the softening operation, the brine valve is normally open and the refill valve 31 is normally closed, but upon the regenerating operation taking place, both the brine valve 32 and refill valve are open, the refill valve 31 being locked open. The brine valve 32 is closed when the predetermined amount of brine has been delivered, but is open upon the softening operation taking place again, but the refill valve 31 remains locked open until a sufficient quantity of water has been restored to the brine tank whereupon it is unlocked and allowed to close. This sequence of operations is effected as follows.

When the brine begins to flow during regeneration, the float 78 is up, the refill valve 31 is locked open due to the fact that the locking plate 40 has descended to a point below the locking plunger 56 which has been forced into position by its spring 57. As the brine flows, the float descends. It will be understood that the refill valve 31 has been opened initially by the hydrostatic pressure behind the diaphragm 42 but this hydrostatic pressure has not been allowed to have access to the diaphragm 46 of the brine valve 32 due to the fact that the ball valve 51 has been closed. When the float gets to a predetermined point and no more brine should be supplied to the system from the brine tank, the downward movement of the float will have carried the bell crank arm 60, link 67 and lever 70 downwardly so that the ball 51 will drop down and open the passageway to admit hydrostatic pressure to actuate the diaphragm 46 and close the brine valve. When the hydrostatic pressure is relieved on these diaphragms, due to the change from regenerating to softening position, the brine valve 32 returns to its initial open position but the refill valve 31 remains locked open so that a portion of the water is diverted from the main supply line as it passes to service and passes into the brine line to the brine tank to replenish the brine tank and continues to do until the float is raised to a point where it pulls the locking plunger against the spring 57 and unlocks the refill valve allowing it to close.

Returning to the control mechanism for this apparatus, it will be observed that a clock 85 of the self-winding type supplied with current from the terminals 86, actuates the gear 87, the gear 88, the beveled gear 89, the beveled gear 90 and the shaft 91. This shaft 91 carries on it an adjustable driving member 92 positioned on the shaft 91 by the set screw 93. The upper end of this shaft is journaled at 94 in the bracket 95. The driving member 92 engages with a driven disk 96 carried on the shaft 97 journaled in the bracket 95 and in the casing 98, which casing serves to support the clock mechanism.

On the other end of the shaft 97 is mounted a worm 99 driving a worm gear 100, which worm gear is mounted on a shaft 101 journaled in this casing 98. This shaft 101 has mounted thereon a sleeve 102 of insulating material, and on this sleeve 102 is a metallic sleeve 103 carrying a cam 104 and an adjustable cam 105 adjustable by the set screw 106, so that the high points of the cams may be adjusted. On this sleeve of metallic material rides a roller 107 carried on the rocker arm 108 which is supported in a bracket 109 and connected to a terminal 110. The other end of the arm is connected by a spring 111 to an insulating plate 112 within the casing. Thus, the roller is kept in engagement with the contact sleeve 103. A second arm 113 has a similar spring 114 and a roller 115 which is adapted to engage with the two cams, one of which has a low point and the other a high point. The cam having the low point is mounted on the insulating sleeve, while the cam having the high point is mounted on the metallic sleeve. Thus, when the high point of the cam is reached, the two rollers and rocker arms and their terminals are electrically connected together, which results in closing a circuit, including the feed wires 116 and 117 which are respectively connected to the terminals 118 and 119. The terminals 110 and 119 are connected to the rocker arms, the terminal 110 is connected by the wire 120 to the wire 121 which results in a solenoid coil 122 being energized when the circuit is closed. The armature 123 controls the valve stem 124 having a valve member 125 closing the passageway 126 through which hydrostatic pressure from the main line passes through the pipes 53 to the brine and refill valves, and through the pipe 127 to the hydrostatic valve 128 for operating the rotary valve 7. The hydrostatic pressure in this valve 128 operates on the diaphragm 129, moves the plunger 130 against the spring 131 and thereby operates the lever 132 pivoted at 133, the other end of which engages at 134 with a lever 135 on the shaft 136 which operates the rotor 10 of the valve.

The brine valve 32 is the valve which controls the exit of brine from the brine tank, and the refill valve 31 controls the passage of water back to the brine tank to refill it with fresh water.

It will be understood that I desire to comprehend within my invention such modifications as may be necessary to adapt it to varying conditions and uses.

Having thus fully described my invention, what I claim as new and desire to secure by Letters Patent, is:

1. In a water softener, a container for softening means, a brine tank, a control valve for converting the softener from softening position to regenerating position and vice versa, timing means to control said valve and its operating means, operating means therefor, a brine valve controlling the application of brine to the softening means, a refill valve controlling the application of water to the brine tank to refill it to take the place of brine exhausted from the tank, and means associated with the brine tank for cooperating in the control of the brine valve and the refill valve.

2. In a water softener, a softening tank, a brine tank, a source of supply of hard water to be softened in the softening tank, a rotary valve for controlling the alternate application of hard water to the softening tank and brine from the brine tank to the softening tank, means for operating said valve, timing means for controlling the operation of said valve operating means, and a brine valve and refill valve controlled by said timing means and operating means for controlling the alternate exit of the brine from the brine tank and refilling of the brine tank with fresh water.

3. In a softener, a container for softening means, a brine tank, a timing means, an electrical circuit adapted to be opened and closed by said timing means, electrical mechanism adapted to be operated thereby to admit hydrostatic pressure from the main line to operate brine and refill valves, a valve for converting the softener from softening position to regenerating position and back to softening position, means to operate said valve, a hydrostatically operated mechanism connected therewith to operate said means, a brine valve and a refill valve operated by said hydrostatic means and a float mechanism in the brine tank for controlling the operation of the refill valve and brine valve.

4. In a softener, a container for softening means, a brine tank, a timing means and electrical circuit adapted to be made thereby or interrupted, means for making or breaking said electrical circuit actuated by said timing means, a valve for converting the softener from softening position to regenerating position or back to softening position, an electrical means controlled by said circuit for effecting the operation of said valve and a brine valve to control the application of brine to the softening tank and refill valve, to control the application of refill water to the brine tank to replenish the supply of liquid exhausted from the brine tank, with cooperating float mechanism in the brine tank, operated through said electrical means, the period of operation being controlled by said float means.

5. In a softener, a container for softening means, a container for brine, an electrically-operated, self-winding clock, circuit making and breaking means driven thereby connected to a source of current on one side and to a solenoid on the other, a needle valve controlled by said solenoid, hydrostatic pressure being controlled by said needle valve, a valve for controlling the regeneration and softening periods in the softener, a hydrostatically operated mechanism adapted to operate said valve through the hydrostatic pressure controlled by the needle valve, a brine valve adapted to control the application of brine to the container for brine and refill valve, adapted to control the delivery of refill water to the container for brine to replenish the liquid in the container controlled by said hydrostatic pressure and by a float means in said container for brine, and a float means.

6. In a softener, a container for softening means, a container for brine, an electrically-operated, self-winding clock, circuit making and breaking means driven thereby connected to a source of current on one side and to a solenoid on the other, a needle valve controlled by said solenoid, hydrostatic pressure being controlled by said needle valve, a valve for controlling the regeneration and softening periods in the softener, a hydrostatically operated mechanism adapted to operate said rotor valve through the hydrostatic pressure controlled by the needle valve, a brine and refill valve, controlled by said hydrostatic pressure and by a float means in said container for brine, and a float means, said rotor valve consisting of a casing and a rotor, said rotor being adapted to deliver fluid to be softened at one end of the tank and deliver from the other end of the tank the water in a softened condition when in softening position, diverting a part of the fluid to the brine means for replenishing it and, in the other position, being adapted to carry the water in the reverse direction out to drain and to draw the brine means over the softening material in the softening means.

7. In a softener, a container for softening means, a container for brine, an electrically-operated, self-winding clock, circuit making and breaking means driven thereby connected to a source of current on one side and to a solenoid on the other, a needle valve controlled by said solenoid, hydrostatic pressure being controlled by said needle valve, a rotor valve for controlling the regeneration and softening periods in the softener, a hydrostatically operated mechanism adapted to operate said rotor valve through the hydrostatic pressure controlled by the needle valve, a brine valve for controlling the application of brine to the container for brine and refill valve to control the delivery of refill water to the container for brine to replenish the container with fluid, controlled by said hydrostatic pressure and by a float means in said container for brine, and a float means, said rotor valve consisting of a casing and a rotor, said rotor being adapted to deliver fluid to be softened at one end of the tank and deliver, from the other end of the tank, the water in a softened condition when in softening position, diverting a part of the fluid to the container for brine for replenishing it and, in the other position, being adapted to carry the water in the reverse direction out to drain and to draw the container for brine over the softening material in the softening means, a float means associated with the brine valve and refill valve being adapted to shut off the brine by the brine valve when a sufficient quantity of brine has been delivered, and to close the refill valve when a sufficient quantity of fluid has been delivered into the container for brine to replenish it.

8. In a water softener, a container for softening means and container for brine, mechanical means for actuating a make and break mechanism, a make and break mechanism, an electrical circuit connected therewith, a solenoid connected thereto, a needle valve member connected to said solenoid, a needle valve controlled thereby, hydrostatic pressure lines leading therefrom to a plurality of diaphragm valves and a hydrostatically operated mechanism, said mechanism being adapted to operate a rotary valve for controlling the softening and regenerating operations and the other valves connected to a refill valve and a brine valve respectively, said refill valve being adapted to control the introduction of refill water to the container for brine and said brine valve being adapted to control the exit of brine from the container for brine, a rotary valve, a system of levers adapted to operate said rotary valve from said hydrostatically operated mechanism, pipes leading from said rotary valve from the top and bottom of said tank to a drain, to a container for brine and to service, a refill valve and brine valve in the brine line, means to lock said refill valve, and a needle valve adapted to control the application of hydrostatic to the brine valve, and a float adapted to control said last mentioned needle valve and said lock.

9. In a water softener, a container for softening means and a container for brine, mechanical means for actuating a make and break mechanism, a make and break mechanism, an electrical circuit connected therewith, a solenoid connected thereto, a needle valve member connected to said solenoid, a needle valve controlled thereby, hydrostatic pressure lines leading therefrom to a plurality of diaphragm valves and a hydrostatically operated mechanism, said mechanism being adapted to operate a rotary valve for controlling the softening and regenerating operations, and the valves being connected to a refill valve and a brine valve respectively, a rotary valve, a system of levers adapted to operate said rotary valve from said diaphragm valve, pipes leading from said rotary valve from the top and bottom of said tank to a drain, to a brine tank and to service, a refill valve and brine valve in the brine line, means to lock the refill valve, a needle valve adapted to control the application of hydrostatic pressure to the brine valve and a float adapted to control said last mentioned needle valve and said lock, and said make and break mechanism consisting of a shaft driven by said mechanical means, a contact sleeve thereon, a roller engaging therewith on a contact arm, and a contact arm connected in said circuit, a second contact arm and contact roller adapted to ride on cams, the lower of which is insulated from said contact sleeve and the higher of which is connected thereto, said second arm being connected into said electrical circuit whereby when the second arm rides with its roller up on the higher cam, the circuit will be made.

In testimony whereof, I affix my signature.

CHARLES P. EISENHAUER.